(12) United States Patent
Griffiths

(10) Patent No.: US 6,840,525 B1
(45) Date of Patent: Jan. 11, 2005

(54) AIR SPRING AND PEDESTAL

(75) Inventor: Paul J. Griffiths, Chester (GB)

(73) Assignee: Meritor Heavy Vehicle Systems Limited, Troy, MI (US)

( * ) Notice: Subject to any disclaimer, the term of this patent is extended or adjusted under 35 U.S.C. 154(b) by 0 days.

(21) Appl. No.: 09/524,436

(22) Filed: Mar. 14, 2000
(Under 37 CFR 1.47)

(51) Int. Cl.$^7$ .............................. B60G 9/02; B60G 11/27
(52) U.S. Cl. ...................... 280/124.116; 280/124.157; 267/64.27; 267/256
(58) Field of Search .................. 280/86.5, 124.116, 280/124.11, 124.157, 124.153, 124.163; 180/209; 267/31, 64.27, 67.23, 64.19, 64.15, 64.11, 122, 256

(56) References Cited

U.S. PATENT DOCUMENTS

| | | | |
|---|---|---|---|
| 3,001,783 A | * 9/1961 | Moody | ........................ 267/34 |
| 5,058,916 A | 10/1991 | Hicks | |
| 5,192,101 A | * 3/1993 | Richardson | ................ 280/86.5 |
| 5,332,258 A | * 7/1994 | Buttner | ...................... 280/86.5 |
| 5,346,247 A | 9/1994 | Snyder | |
| 5,351,986 A | 10/1994 | Hedenberg et al. | |
| 5,403,031 A | 4/1995 | Gottschalk et al. | |
| 5,403,032 A | * 4/1995 | Hellwig | ............... 280/124.163 |
| 5,655,788 A | 8/1997 | Peaker | |
| 6,007,078 A | * 12/1999 | Gottschalk et al. | .... 280/86.751 |
| 6,092,819 A | * 7/2000 | Overby et al. | ........ 280/124.153 |
| 6,123,347 A | * 9/2000 | Christenson | ............... 280/86.5 |

FOREIGN PATENT DOCUMENTS

| | | | |
|---|---|---|---|
| EP | 554573 A2 | 8/1993 | .......... B60G/11/27 |
| EP | 742113 A1 | 11/1996 | .......... B60G/11/46 |

* cited by examiner

Primary Examiner—David R. Dunn
(74) Attorney, Agent, or Firm—Carlson, Gaskey & Olds

(57) ABSTRACT

A suspension system includes a longitudinal member, an air spring, a damper and an axle assembly. The air spring is not directly attached to the chassis but is mounted to contact a locating plate attached to the chassis. The locating plate includes a lip such that the locating plate is of a frustum configuration that laterally locates and self aligns the air spring upon pivotal movement and re-alignment of the air spring with the chassis. Preferably, the suspension system includes a protective skirt which aids in bringing the air cell into a correct position with the locating plate. In addition the axle assembly extends away from the chassis at a speed restricted by the damper such that the anti-vacuum system can equalize the pressure within the air cell.

25 Claims, 2 Drawing Sheets

AIR SPRING AND PEDESTAL

BACKGROUND OF THE INVENTION

The present invention relates to an air suspension, and more particularly to an anti-vacuum system with a separating air spring for a vehicle which requires an axle to be lowered away from the chassis.

A common air suspension system typically comprises bracket secured to a chassis of a vehicle. A longitudinal member extending generally lengthwise of the vehicle is mounted to the bracket for pivoting about an axis generally transverse of the vehicle and to carry an axle having one or more road wheels. An air spring mounted spaced from the axis acts as an adjustable compression spring between the vehicle and the longitudinal member to bias the wheels for effective road engagement and to buffer axle and wheel vibration. The air spring typically includes a piston and an air cell. The piston is mounted to the longitudinal member and the air cell is attached to a bead plate mounted to the chassis.

Vehicles fitted with an air suspension are sometimes used without being inflated such as when being transported on railroad cars. At other times the vehicle axles are left to hang away from the chassis in an unloaded condition on the wheels such as when the vehicle is lifted on and off a ship. These operations cause the air spring to extend without air. Because the air cell is attached to the chassis and the piston is mounted to the longitudinal member, a partial vacuum forms inside the air spring during this expansion. The partial vacuum collapses the air spring air cell inwards and over the top of the piston. When a load is again placed on the suspension the air spring is compressed and the collapsed air cell may become trapped between the piston and upper mounting. Damage to the various rubber parts, connections and mountings can then result when the air spring is reinflated.

Conventional systems to overcome the partial vacuum problem include anti-vacuum valves which allow atmospheric air to enter the air spring if a partial vacuum forms. These systems are only partially effective because the air spring extends faster than air can be drawn through inlet orifices or valving prevalently used.

Other systems allow the air spring to separate from the chassis. The air spring must then be relocated to the chassis when a load is again placed on the suspension. Prior systems provide a cylindrical fitting which receives a post located on the air spring. However, this system creates realignment difficulties as the relatively small fittings can fail to properly relocate the air spring. In addition, a partially inflated air cell is a further impediment to proper air spring realignment as the post is incorrectly positioned for contact with the cylindrical fitting.

Accordingly, it is desirable to provide an improved air suspension for a vehicle which allows the axle assembly to extend away from the chassis and be laterally relocated for consistent reengagement irrespective of the inflated condition of the air cell.

SUMMARY OF THE INVENTION

The suspension system of the present invention generally includes a longitudinal member, an air spring, a damper and an axle assembly.

The longitudinal member extends generally lengthways of a vehicle and is pivotally connected within a bracket to a pivot generally transverse of the vehicle which permits movement of the longitudinal member and defines an axis. From the pivot, the longitudinal member extends to mount the air spring. The axle assembly of the vehicle is secured to the longitudinal member between the pivot and the air spring. A telescopic suspension damper interconnects the axle assembly and the bracket.

The air spring includes an air cell and a piston which act as a compression spring between the longitudinal member and a chassis. The piston is actuated by a gas feed connected to a vehicle air supply. A bottom of the piston is attached to the longitudinal member and the air cell is attached to a piston top. The gas feed is extended along the longitudinal member and enters the bottom of the piston. The gas feed is located in a protected location and extends through the piston. A coupling attaches the air cell to the piston.

The air spring is not directly attached to the chassis but is mounted to contact a locating plate attached to the chassis. That is, the air spring is self-contained and moves as an enclosed unit relative to the chassis. Preferably, the locating plate includes a lip having a diameter greater than the diameter of the portion of the air spring to be received in the plate. The locating plate preferably has a generally frustroconical configuration. The air cell is consistently laterally relocated by the locating plate. In addition, the locating plate self-aligns the air cell with the chassis to prevent the air cell from being trapped between the piston and upper mounting.

In one embodiment, the locating plate includes a protective skirt. The protective skirt further directs the air cell into a correct position with the locating plate. Further, by extending the protective skirt at the rear of the suspension system, the protective skirt protects the air spring from contact with material and debris.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
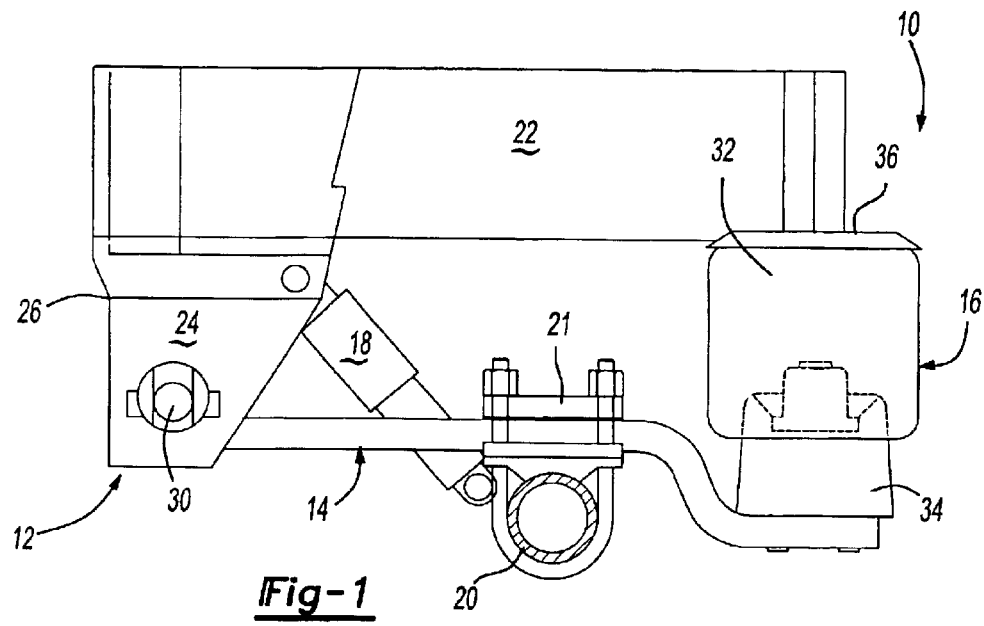
FIG. 1 is a general side view of a vehicle suspension system according to the present invention.

FIG. 1 illustrates an air suspension system 10 for a vehicle. The system 10 generally includes a bracket 12, a longitudinal member 14, an air spring 16, a damper 18 and an axle assembly 20. The system is fixed to a chassis of the vehicle (shown schematically at 22).

The disclosed bracket 12 has side members 24 which depend from the chassis, and a front plate 26 interconnecting the side members 24. The bracket 12 thus has a box-like construction, however, one skilled in the art will understand that other bracket configurations would benefit from the present invention.

The longitudinal member 14 extends generally lengthways of the vehicle and is pivotally connected within the bracket 12 to a pivot 30. The pivot 30 permits movement of the longitudinal member 14 and defines an axis generally transverse of the vehicle. From the pivot 30, the longitudinal member 14 extends rearwardly to mount the air spring 16. An axle assembly 20 of the vehicle is secured to the longitudinal member 14 between the pivot 30 and the air spring 16 by a clamp 21. A telescopic suspension damper 18 interconnects the axle assembly 20 and the bracket 12.

The air spring 16 includes an air cell 32 and a piston 34 which act as a compression spring between the longitudinal member 14 and the chassis 22 to bias the wheels (not shown) for effective road engagement and to buffer axle and wheel vibration. It is to be understood that the term air spring as used herein is not intended to be construed narrowly and should be taken to include bellows, air bags, and so forth.

The air spring 16 is not directly attached to the chassis 22 but is mounted to come in contact with a locating plate 36 attached to the chassis 22 upon pivotal movement of the longitudinal member 14. Pivotal movement of the longitudinal member 14 about the pivot 30 toward the chassis 22 moves the air spring 16 into contact with the locating plate 36. Similarly, pivotal movement of the longitudinal member 14 about the pivot 30 away from the chassis 22 moves the air spring 16 out of contact with the locating plate 36.

Figure 2:
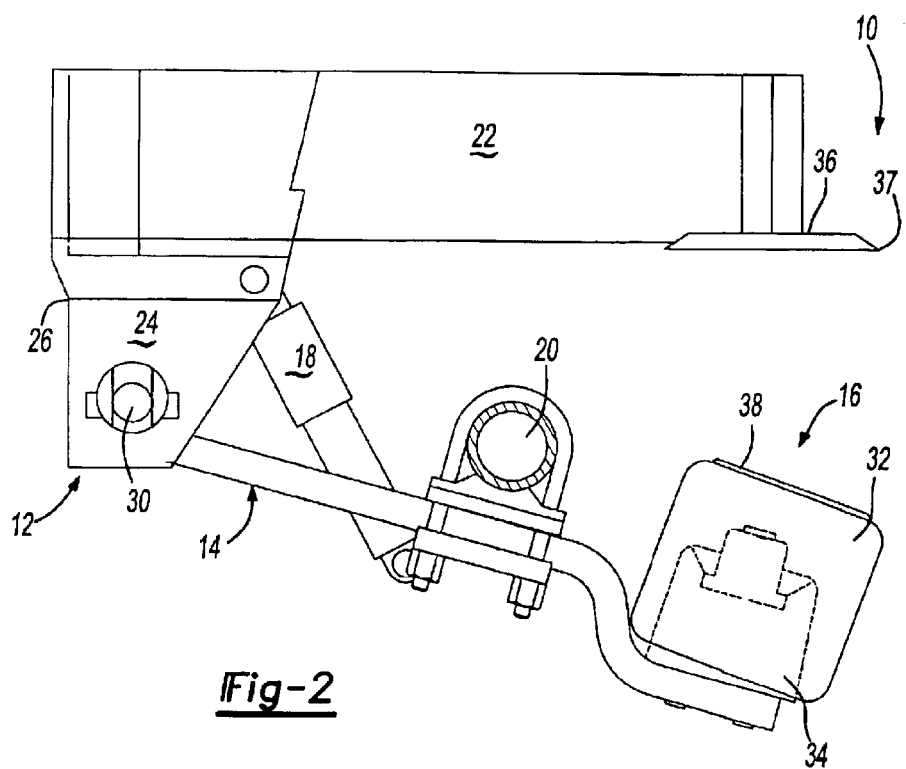
FIG. 2 is a general side view of the suspension system of FIG. 1 in an unloaded condition showing the longitudinal member extended away from the chassis.

At times the vehicle longitudinal member 14 and axle assembly 20 are left to hang away from the chassis with no load at the wheels such as when the vehicle is lifted from the ground. FIG. 2 shows the resultant disengagement of the air spring 16 from the chassis 22. As the air spring 16 is attached to the longitudinal member 14, the air cell 32 can not be over-extended between the unloaded longitudinal member 14 and chassis 22. The air cell 32 therefore protected from the possibility of inversion.

The air spring 16 preferably includes a bead plate 38 attached to the top of the air cell 32. The bead plate 38 contacts the locating plate 36. The locating plate 36 provides seating engagement for the bead plate 38 and therefore mating alignment of the air spring 16 to the chassis 22 (FIG. 1.) The locating plate 36 includes a lip 37. Preferably, the locating plate 36 is of a frustro-conical configuration that laterally locates and self aligns the air spring 16 upon pivotal movement and re-alignment of the air spring 16 with the chassis 22. The inner dimensions of the lip 37 are longer than the outer dimension of bead plate 38. In this way, the air spring 16 is easily aligned.

Further, by fitting air spring 16 within the locating plate 36, the air spring is self-locating and self-aligning even when the air spring 16 is only partially deflated. This substantially reduces the possibility that the air cell 32 could be torn or improperly compressed when the suspension system 10 again undertakes a loaded condition.

Figure 3:
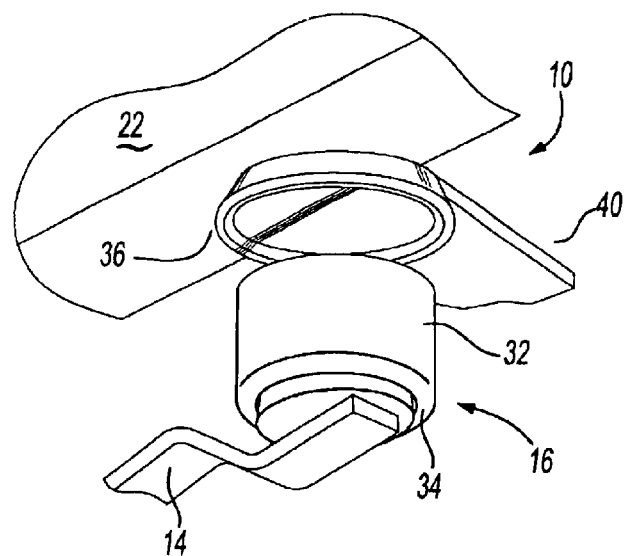
FIG. 3 is a partial perspective view of a suspension system having a protective skirt according to the present invention.

As shown in FIG. 3, the suspension system 10 can also include a protective skirt 40 attached to the locating plate 36. The protective skirt 40 is preferably of a semi-rigid material and extends from or is integral to the locating plate 36 to further protect the air spring 16 air cell 32. The protective skirt 40 also guides the air cell 32 into contact with the locating plate 36 when the longitudinal member 14 pivots toward the chassis 22. In other words, when the suspension system 10 moves from an unloaded condition to a loaded condition the protective skirt 40 further directs the air cell 32 into correct position with the locating plate 36 and correctly compresses the air cell 32. Further, by extending the protective skirt 40 at the rear of the suspension system 10, the protective skirt 40 particularly protects the air spring 16 when used on a vehicle such as a dump truck which reverses into contact with material and debris.

Figure 4:
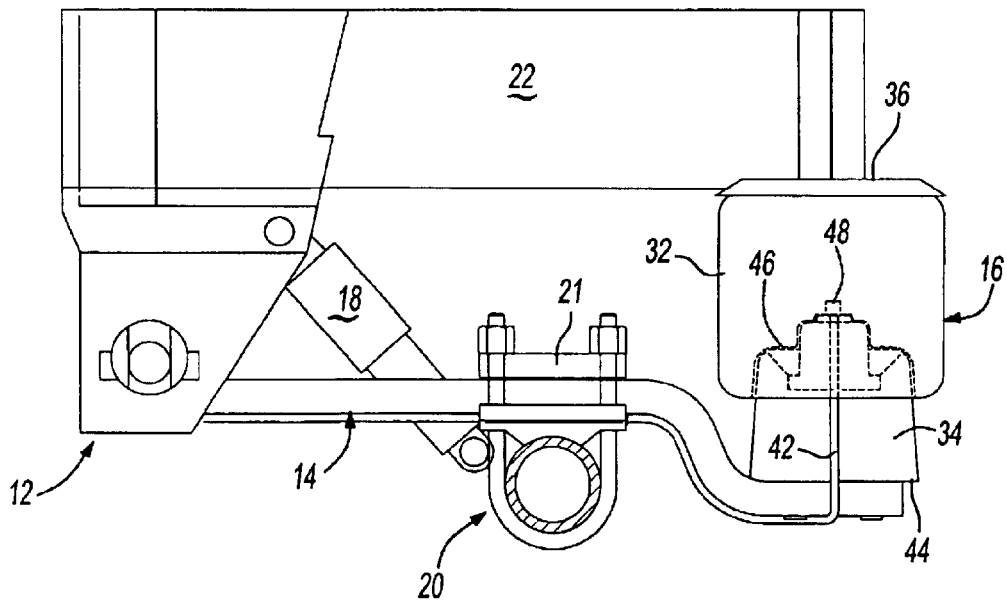
FIG. 4 is an expanded side view of a suspension system according to the present invention.

As further shown in FIG. 4, the air spring 16 includes the air cell 32 which is powered by the piston 34. The piston 34 is actuated by a gas feed 42 connected to the vehicle air supply (not shown.) A bottom 44 of the piston 34 is attached to the longitudinal member 14 and the air cell 32 is attached to a top 46 of the piston 34. Preferably, the gas feed 42 extends along the longitudinal member 14 and enters the bottom 44 of the piston 34. The gas feed 42 is located in a protected location along the longitudinal member 14 which provides an efficient route to the piston 16 even when the air spring 16 separates from the chassis 22. In addition, by extending the gas feed 42 through the piston 16, a coupling 48 can be provided which attaches the air cell 32 to the piston 34. The coupling 48 thereby provides the dual function of securing both the gas feed 42 and attachment of the air cell 32.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air suspension system for a vehicle comprising:
    a longitudinal member extending generally lengthways of a vehicle and mountable to the vehicle for pivotal movement about an axis generally transverse of the vehicle;
    a locating plate attachable to the vehicle; and
    an air spring disposed between said longitudinal member and said locating plate, pivotal movement of said longitudinal member about said axis toward the vehicle moving said air spring into contact with said locating plate and unloaded pivotal movement of said longitudinal member about said axis away from the vehicle moving said air spring out of contact with said locating plate.

2. The system as recited in claim 1, wherein said air spring is attached to said longitudinal member.

3. The system as recited in claim 1, wherein said locating plate aligns said air spring upon pivotal movement of said longitudinal member about said axis toward the vehicle.

4. The system as recited in claim 1, wherein said locating plate includes a lip about a perimeter of said locating plate.

5. The system as recited in claim 4, wherein said lip has an inner dimension larger than an outer dimension of an upper portion of said air spring which is received in said lip.

6. The system as recited in claim 5, including a protective skirt attached to said locating plate.

7. The system as recited in claim 5, wherein said upper portion of said air spring is a plate attached to a top of said air spring.

8. An air suspension system for a vehicle comprising:
    a longitudinal member extending generally lengthways of a vehicle and mountable to the vehicle for pivotal movement about an axis generally transverse of the vehicle;
    an axle assembly mounted to said longitudinal member;
    a damper disposed between said longitudinal member and the vehicle, said damper providing a dampening force for said axle assembly;

a locating plate attachable to the vehicle; and an air spring having an air cell and a piston, said air spring attached to said longitudinal member and disposed between said longitudinal member and said locating plate, pivotal movement of said longitudinal member about said axis toward the vehicle moving said air spring into contact with said locating plate and unloaded pivotal movement of said longitudinal member about said axis away from the vehicle moving said air spring out of contact with said locating plate.

9. The system as recited in claim 8, wherein said locating plate has a frustum conical outer lip.

10. The system as recited in claim 9, wherein said frustum conical outer lip has an inner dimension larger than an outer dimension of an upper portion of said air spring which is received in said frustum conical outer lip.

11. The system as recited in claim 10, further comprising a protective skirt attached to said locating plate.

12. The system as recited in claim 8, further comprising a gas feed extending through said piston.

13. The system as recited in claim 12, wherein a bottom of said piston is attached to said longitudinal member and said air cell is attached to a top of said piston, said gas feed extending along said longitudinal member and entering said bottom of said piston.

14. An air suspension system for a vehicle comprising:

a longitudinal member extending generally lengthways of a vehicle and mountable to the vehicle for pivotal movement about an axis generally transverse of the vehicle;

an axle assembly mounted to said longitudinal member;

a damper disposed between said longitudinal member and the vehicle, said damper providing a dampening force for said axle assembly;

a locating plate attachable to the vehicle, said locating plate having a frustum conical configuration;

a protective skirt attached to said locating plate; and an air spring disposed between said longitudinal member and said locating plate, said air spring having an air cell and a piston having a gas feed, a bottom of said piston attached to said longitudinal member and a top of said piston attached to said air cell, said gas feed extending along said longitudinal member and entering said bottom of said piston wherein pivotal movement of said longitudinal member about said axis toward said vehicle moves said air spring into contact with said locating plate, said locating plate laterally locating said air cell with said locating plate and wherein unloaded pivotal movement of said longitudinal member about said axis away from the vehicle moves said air cell out of contact with said locating plate.

15. The system as recited in claim 14, wherein said gas feed includes a coupling, said coupling retaining said air cell to said piston.

16. The system as recited in claim 14, wherein said locating plate includes a lip that has an inner dimension larger than an outer dimension of an upper portion of said air spring which is received in said lip.

17. The system as recited in claim 1, wherein said locating plate includes a center portion defining a substantially continuous and unbroken surface that selectively engages an upper surface of said air spring.

18. The system as recited in claim 17, wherein said locating plate includes a transversely extending lip formed about said center portion wherein said transversely extending lip has a greater diameter than said center portion.

19. The system as recited in claim 8, wherein said locating plate includes a center portion having a generally flat contact surface for engaging said air spring and a lip formed about a perimeter of said center portion, said lip increasing in diameter in a radially outward direction.

20. An air suspension system for a vehicle comprising:

a longitudinal member mounted for pivotal movement about an axis;

an air spring having a lower portion supported by said longitudinal member and an upper portion defining a first engagement surface; and a locating plate held fixed relative to a vehicle structure, said locating plate including a center portion defining a second engagement surface wherein pivotal movement of said longitudinal member about said axis moves said air spring between an engaged position where said first engagement surface engages at least a portion of said second engagement surface and a disengaged position where said first engagement surface is separated from said second engagement surface.

21. The system as recited in claim 20, wherein said locating plate includes a transversely extending lip formed about an outer perimeter of said center portion.

22. The system as recited in claim 21, wherein said transversely extending lip has a greater diameter than said upper portion of said air spring.

23. The system as recited in claim 21 wherein said first and second engagement surfaces are substantially continuous and unbroken surfaces.

24. The system as recited in claim 23, wherein said center portion comprises a generally flat plate and said transversely extending lip increases in diameter in a radially outward direction.

25. The system as recited in claim 24, including a generally flat bead plate mounted to said upper portion of said air spring to form said first engagement surface.

* * * * *